[11] 3,597,040

| | | | |
|---|---|---|---|
| [21] | Appl. No. | 649,234 | |
| [22] | Filed | June 27, 1967 | |
| [45] | Patented | Aug. 3, 1971 | |
| [73] | Assignee | Light Optical Works Ltd. Suwa-shi, Nagano-ken, Japan | |

[54] TELESCOPIC SIGHT WITH BIASING SPRING
1 Claim, 3 Drawing Figs.

[52] U.S. Cl. ............................................. 350/10,
33/50.5, 350/45, 350/54, 356/16
[51] Int. Cl. ............................................. G02b 27/32
[50] Field of Search ............................................. 350/10,
40—49, 54, 16; 356/16; 33/50.5

[56] References Cited
UNITED STATES PATENTS

| | | | |
|---|---|---|---|
| 1,167,164 | 1/1916 | Grebe | 350/10 X |
| 2,496,045 | 1/1950 | Ford | 350/10 (UX) |
| 2,784,641 | 3/1957 | Keuffel et al. | 350/10 X |
| 3,058,391 | 10/1962 | Leupold | 350/10 |
| 3,359,849 | 12/1967 | Friedman | 350/10 X |
| 2,955,512 | 10/1960 | Kollmorgen et al. | 350/10 X |
| 3,161,716 | 12/1964 | Burris et al. | 350/10 X |

*Primary Examiner*—David Schonberg
*Assistant Examiner*—Toby H. Kusmer
*Attorney*—Hill, Sherman, Meroni, Gross & Simpson ABSTRACT: A rifle telescope of an inexpensive, yet extremely flexible, type incorporating means adjusting the position of the target image by transverse movement of collector lens elements while the image is in the inverted condition as received from the objective lens system of the telescope. The image erection lens system is rigidly mounted in the main telescope barrel as is the oscular lens system thereby providing a rifle telescope having substantially all of the critical lenses thereof rigidly, although adjustably mounted in the fixed telescope barrel and only a minimal collector lens system movably mounted.

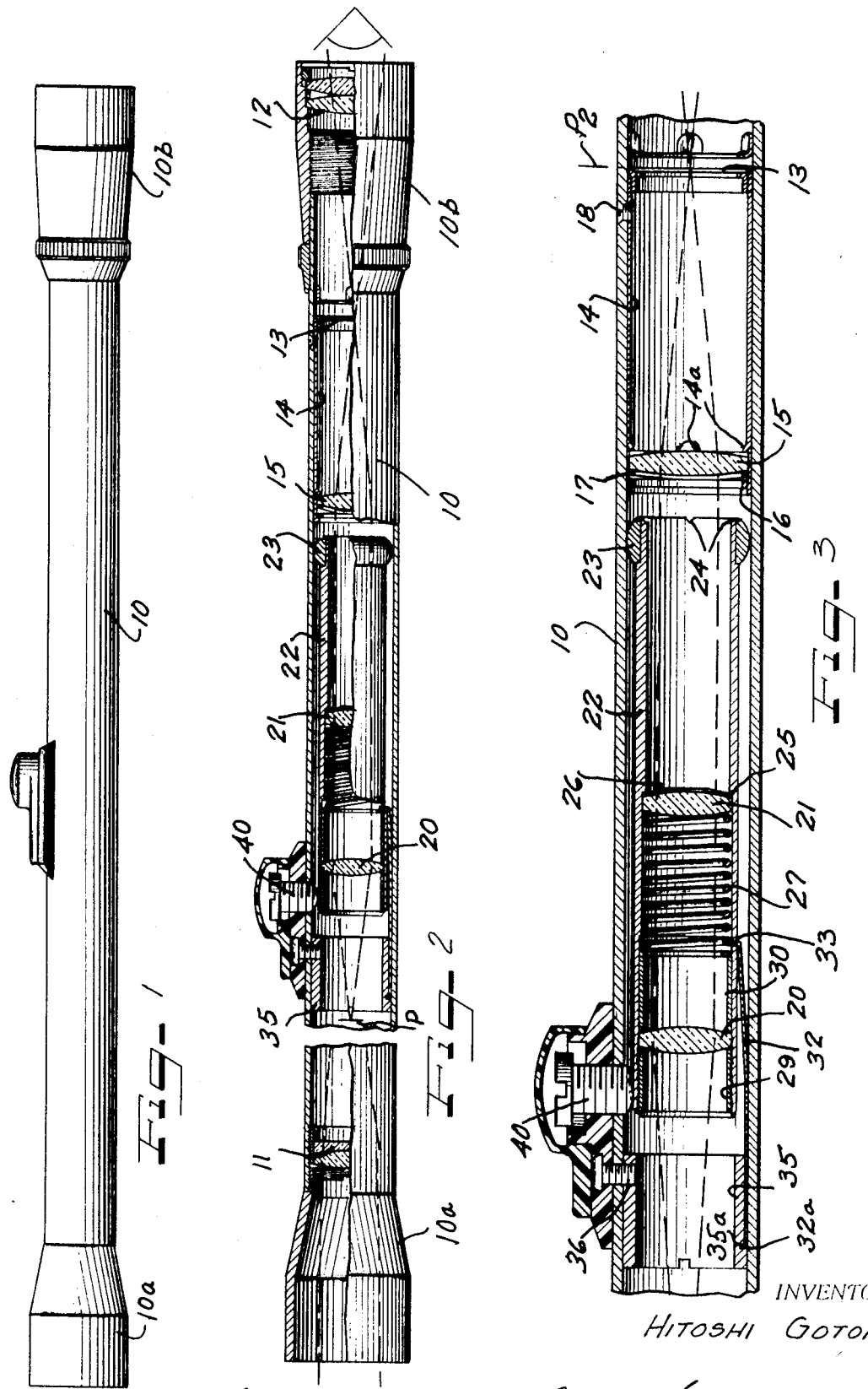

TELESCOPIC SIGHT WITH BIASING SPRING

BACKGROUND OF THE INVENTION

In recent years much development work has been undertaken in the field of rifle telescopes and, particularly, in the development of improved means for providing sighting adjustments. Historically, telescope sights were adjustable by moving the sighting reticle transversely of the axis of the telescope over the target image to thereby center the reticle on the target. In such systems, of course, the main tube of the telescope stayed fixed and defined the field of view. Accordingly, movement of the reticle for sighting adjustment purposes caused the reticle to be moved away from the centered condition relative to the field of view, a condition which in extreme cases could cause the reticle to move a very significant distance away from the central location.

In more recent times rifle telescopes have been constructed in which the reticle and the erector lens system were simultaneously movably mounted within the main telescope tube. Such systems may be found, for example, in the U.S. Pat. No. 2,858,732 to Kollmorgen. The introduction of the movable erector lens system provided a very substantial advantage in adjustability but it has occasioned many production complexities. This is particularly true in the case of telescopes constructed for the mass market including inexpensive telescopes which may be subjected to extremely hard use and abuse in handling.

The construction of a rifle telescope incorporating a pivotal erector lens system with the reticle similarly positioned in the erector system has required that the erector lens be adjustably movably mounted. This has been accomplished by providing the erector lens in an inner tube which is universally pivotally mounted about one end and resiliently positioned by adjusting screws at the other end. During violent movement of the rifle telescope vibrations are caused within the telescope which can cause variation in the adjustments due to the substantial mass of the erector lens system and its supporting tube. The purpose of the present invention is to provide a rifle telescope system in which a movable system of optics is employed but in which the image inverting or correcting lens is fixed within the main tube, in which the reticle is similarly fixed within the main tube, and in which the objective lens and ocular lens systems are likewise all fixed. Adjustment is accomplished by providing a collector lens system, constructed of relatively lightweight, thin lens or lenses, which is pivotally mounted. The weight of the laterally movable adjusting lenses is, accordingly, reduced and, further, the criticality of axial position of the lenses thus pivotally mounted is substantially reduced and vibrations that can result from use or abuse of the telescope in position upon a rifle are minimized.

SUMMARY OF THE INVENTION

In the preferred embodiment of the present invention a rifle telescope is provided having a main tube with an objective lens system at the forward end and an ocular lens system at the rearmost end. Slightly forward of the ocular lens system a fixed reticle, in any conventional form, is provided, and immediately forward of the reticle an erector lens is fixedly secured in the main telescope tube. The erector lens is rigidly, preferably adjustably, fixed relative to the reticle in a manner focusing light rays leaving the erector lens in the focal plane of the reticle; and the ocular lens system is positioned relative to the reticle to place the reticle and the image focused on the reticle plane by the erector lens, in focus to the viewer. Light rays reaching the telescope from a distant object pass through the objective lens and are inverted by that lens at a focal plane positioned between the objective lens and the erector lens. In order to provide adjustment, in the preferred embodiment of the present invention, a collector lens system is provided which gathers the light rays from the objective lens system, following their inversion and transfers the light rays in an approximately parallel condition through a collector tube positioned within the main tube of the telescope. The collector tube is universally pivotally mounted at one end, preferably the rearmost end thereof, and is adjustable at the other, preferably forwardly directed, end by means of adjusting screws and resilient biasing means. The collector lenses employed are spaced in the collector tube to provide a relatively long collector tube and, accordingly, a fine adjustment in terms of angle of inclination from the centerline of the telescope. Means are provided for axially positioning the collector lens tube relative to the image erecting lens so that rays reaching the erecting lens will be properly focused at the reticle plane.

Accordingly, it is an object of the present invention to provide a novel and extremely simple and inexpensive, and unusually rugged rifle telescope.

Another object of the present invention is to provide a rifle telescope having improved optical performance in the field.

A feature of the invention resides in the utilization of a relatively lightweight collector lens system for purposes of adjustment of the image relative to a fixed reticle positioned within the telescope tube.

Still another feature of the invention resides in the provision of adjustment of the image of a rifle telescope while at the same time maintaining the objective lens system, the erecting lens system, and the reticle in fixed, rigid position within the main tube thereof.

Still other features and objects of the invention will at once become apparent to those skilled in the art from a consideration of the attached specification and drawings.

DETAILED DESCRIPTION

As may be seen from a consideration of FIGS. 1 through 3 of the drawings, the present invention relates to a rifle telescope which may be mounted upon a rifle, not shown, by any conventional mounting means, also not shown. The telescope has a main housing 10 having a forward end 10a and a rearward end 10b carrying, respectively, an objective lens system 11 and an ocular or eyepiece lens system 12. Each of these lens systems is conventional in construction and may comprise one or more individual lens elements. As shown in FIG. 2, a reticle 13 is mounted in a tube or subhousing 14 in which an erecting lens 15 is similarly secured in a rigid manner. The lens 15 abuts against staked surfaces 14a of the tube 14 by a threaded ring 16 acting against a spring washer 17. The tube 14 is rigidly secured in the main housing 10 by way of a screw 18. A collector lens system comprising lens elements 20 and 21 is mounted within a separate collecting lens mounting tube 22. The tube 22 is pivotally mounted in a universal manner by way of an annular ring 23 rigidly mounted on the tube 22 by being staked as at 24. Tube 22 is provided with a shoulder 23 against which lens 21 as well as a diaphragm opening element 26 seats. Spring 27 acts against lens 21 to maintain it in its axial position against the stop shoulder 25. Lens 20 is axially positioned by means of adjustable sleeve 29 threaded in the forward or left-hand end of the tube 22 into a fixed position. Freely slidable sleeve 30 is biased by spring 27 against the lens 20 in the manner positively seating the lens 20 against the sleeve 29. In this manner, both lenses 20 and 21 are spring-biased apart into relative axially adjusted, fixed positions in the tube 22. Tube 22 is axially positioned relative to the main tube 10 by means of a locating detent 32 having an upstruck tang 33 fitting into an aperture in tube 22. The other end of the detent 32 is secured by screw 36 to tube 10. The detent 32 may be secured to the sleeve 35 in any conventional manner but is shown as being retained in an axial slot having a radially extending recess 35a accommodating tang 32a. Detent 32 comprises a spring acting, in addition to its axial positioning function, as a means biasing the tube 22 against main image adjusting screw means 40. As in conventional telescopes, there are two screws 40 at 90° relative to each other on respective horizontal and vertical axes while the spring 32 is diagonally opposite the bisector of the angle formed by the two image adjusting screws to thereby provide a resilient bias against both of the adjusting screws simultaneously.

In assembling the device, the tube 14 with its erector lens 15 is rigidly secured by the screw 18 in the housing 10. This positioning determines the position of the reticle 13 upon which the ocular lens system 12 is focused. The separate tube 22, positioned by means of the sleeve 35 and screw 36 and receives an inverted image from the objective lens system 11. As a result of the arrangement described, an image received in an erect condition by the objective lens 11 is inverted at a first focal plane P and is passed down the tube to the erector lens by the collector lenses 20 and 21 in the tube 22. Following passage through lens 15, the light rays are focused upon the reticle 13 in the second focal plane P2 and inverted for transfer to the viewer's eye by way of eyepiece lens system 12.

In practice, the collector system can be made very lightweight in construction and is, in practice, less than one-half ounce in weight. This accomplished through the use of aluminum tubing for the parts 22, 23, 29 and 30. By providing the resilient spring 27, vibrations occasioned through use or abuse of the telescope are dissipated and can have no permanent effect on the lenses 20,21 thereby providing an extremely strong telescope. In view of the fact that the lenses 20,21 are collector lenses rather than image-inverter devices in the system employed, the absolute, or exact axial position of the tube 22 is less critical than the position of the lens 15 relative to reticle 13 is, for example. Accordingly, slight variations that may be occasioned by abuse are not critical to the satisfactory operation of the system.

I have, accordingly, provided a novel and improved telescope system in which adjustment of the collector lens system provides for an adjustment of the image while at the same time the reticle, erector lens, objective lens and ocular lens systems are all rigidly secured in the telescope. The use of lightweight construction for the tube 22 has minimized problems of vibration in use and an extremely strong, yet very inexpensive, rifle telescope has accordingly been achieved. It will be understood that variations may be made without departing from the scope of the novel concepts of the present invention and it is, accordingly, my intention that the scope of the invention be limited solely by that of the hereinafter appended claims.

I claim:

1. A rifle telescope comprising;

a tubular housing having first and second ends;

an objective lens mounted in said tubular housing adjacent said first end;

an ocular lens mounted in said tubular housing adjacent said second end;

a reticle means fixedly mounted in said tubular housing adjacent said ocular lens but spaced further from said second end than said ocular lens;

a collector lens tube with first and second ends pivotally mounted from said first end in said tubular housing by a universal joint between said reticle means and said objective lens such that said first end of said collector lens tube may pivot relative to said tubular housing without moving transversely thereof;

adjustment means mounted in said tubular housing and engageable with said second end of said collector lens tube to move it transversely of said tubular housing;

resilient longitudinal locking means formed with a detent and mounted to said tubular housing between said collector lens tube and said tubular housing to bias it toward said adjustment means;

means forming an opening in said collector lens tube into which said detent is received to prevent said collector lens tube from moving longitudinally of said tubular housing;

a pair of stops formed in said collector lens tube;

a pair of collector lenses mounted in said collector lens tube between said stops; and spring means mounted between said pair of collector lenses and biasing them apart and toward said stops.